United States Patent
Heidasch

(10) Patent No.: US 8,527,451 B2
(45) Date of Patent: Sep. 3, 2013

(54) BUSINESS SEMANTIC NETWORK BUILD

(75) Inventor: Robert Heidasch, Speyer (DE)

(73) Assignee: SAP AG, Walldorf (DE)

( * ) Notice: Subject to any disclaimer, the term of this patent is extended or adjusted under 35 U.S.C. 154(b) by 362 days.

(21) Appl. No.: 13/050,092

(22) Filed: Mar. 17, 2011

(65) Prior Publication Data

US 2012/0239606 A1 Sep. 20, 2012

(51) Int. Cl.
- *G06F 17/00* (2006.01)
- *G06N 7/00* (2006.01)
- *G06N 7/08* (2006.01)

(52) U.S. Cl.
USPC .......................................................... 706/55

(58) Field of Classification Search
USPC .......................................................... 706/55
See application file for complete search history.

(56) References Cited

U.S. PATENT DOCUMENTS

| | | | |
|---|---|---|---|
| 4,661,924 A | 4/1987 | Okamoto et al. | |
| 5,995,920 A | 11/1999 | Carbonell et al. | |
| 6,163,785 A | 12/2000 | Carbonell et al. | |
| 6,519,586 B2 | 2/2003 | Anick et al. | |
| 7,107,264 B2 | 9/2006 | Lu | |
| 7,383,172 B1 | 6/2008 | Jamieson | |
| 7,580,831 B2 | 8/2009 | Haskell et al. | |
| 7,702,647 B2 * | 4/2010 | Uceda-Sosa | 707/999.103 |
| 7,711,689 B2 * | 5/2010 | Kim | 707/600 |
| 7,774,404 B2 * | 8/2010 | Heidasch | 709/201 |
| 7,865,358 B2 | 1/2011 | Green et al. | |
| 7,958,074 B2 * | 6/2011 | Uceda-Sosa | 706/46 |
| 8,156,473 B2 * | 4/2012 | Heidasch | 717/124 |
| 8,205,120 B2 * | 6/2012 | Heidasch et al. | 714/45 |
| 8,239,839 B2 * | 8/2012 | Rossmann et al. | 717/129 |
| 8,335,314 B2 * | 12/2012 | Heidasch | 380/35 |
| 8,335,754 B2 * | 12/2012 | Dawson et al. | 706/45 |
| 2003/0130976 A1 | 7/2003 | Au | |
| 2007/0156677 A1 | 7/2007 | Szabo | |
| 2007/0226242 A1 | 9/2007 | Wang et al. | |
| 2007/0255702 A1 | 11/2007 | Orme | |
| 2007/0277164 A1 | 11/2007 | Nandakumaraiah | |
| 2007/0294200 A1 | 12/2007 | Au | |
| 2008/0097748 A1 | 4/2008 | Haley et al. | |
| 2008/0147646 A1 | 6/2008 | Jaschek et al. | |
| 2008/0281810 A1 | 11/2008 | Smyth et al. | |
| 2009/0177463 A1 | 7/2009 | Gallagher et al. | |
| 2009/0216696 A1 | 8/2009 | Downs et al. | |
| 2010/0268702 A1 | 10/2010 | Wissner et al. | |

(Continued)

FOREIGN PATENT DOCUMENTS

WO 2006124952 11/2006

OTHER PUBLICATIONS

European Search Report for EP 12 00 3993, dated Jul. 23, 2012.
European Search Report for EP 12 00 4745, dated Mar. 28, 2013.

(Continued)

*Primary Examiner* — Michael B Holmes
(74) *Attorney, Agent, or Firm* — Kenyon & Kenyon LLP

(57) ABSTRACT

Pre-existing business objects (e.g., component parts of large business applications) may already define a hierarchy of related terms and include a search index created by a pre-existing search function. A semantic network including a plurality of semantic knowledge domains may be constructed automatically, based on the objects' initial terms structure and search index, and further modified by search results and related terms returned by the search function. This way, a customer specific semantic network may be constructed automatically from pre-existing software components and terms.

15 Claims, 3 Drawing Sheets

(56) References Cited

U.S. PATENT DOCUMENTS

| | | |
|---|---|---|
| 2010/0286979 A1 | 11/2010 | Zangvil et al. |
| 2011/0022798 A1 | 1/2011 | Hou et al. |
| 2011/0078205 A1 | 3/2011 | Salkeld et al. |
| 2011/0225139 A1 | 9/2011 | Wang et al. |
| 2011/0257963 A1 | 10/2011 | Zuev et al. |

OTHER PUBLICATIONS

Ahu Sieg et al., "Web search personalization with ontological user profiles", Proceedings of the sixteenth ACM Conference on Conference on Information and Knowledge Management, CIKM '07, Jan. 1, 2007, pp. 525-534, XP050048869.

* cited by examiner

BUSINESS SEMANTIC NETWORK BUILD

BACKGROUND

A semantic network is a network that represents semantic relations among terms (e.g., concepts). A semantic network may be used as a form of knowledge representation, and therefore may be used to model business knowledge in companies and their various parts, e.g. as enterprise knowledge and/or terminology.

The typical usage may be in search engines, where the network may be used within different techniques to identify the meaning of the term and/or sentence. Mainly the search terms are defined as words in some order or relation. The searched term may then be interpreted by the search engine as a string/term. For example, the search result for "Lotus" may be divided into results about "Lotus" as a model of a car, "Lotus" as a brand of car oil, and "Lotus" as a flower. In this situation, there are different knowledge domains. The knowledge domains can be ordered hierarchically, which allows for knowledge grouping, e.g. the first two meanings may belong to similar knowledge groups, and the last one has nothing in common and is defined in a completely different context/knowledge group (e.g., as a flower).

In this application, some modeling solutions are used to define the context of particular terms/information. Knowledge domain group terms may be organized and belong to the same knowledge area or expertise area, for example: IT, finance, etc. The knowledge area or expertise area may be grouped into knowledge domains and may be used to specify the context of the required information and therefore deliver data with better quality. Typically the business knowledge and the terminology used is distributed throughout the entire company, experts within the company, management heads, and large volumes of documents, etc. The main problem is how to detect and determine used business terminology and then consolidate it in a domain-oriented semantic network.

From another side, the modern business applications are built from business objects that group or encapsulate the definition of relevant business content information. A business object structural model may contain one root node and zero to many business object nodes. The node's hierarchy (i.e. tree) may be built using associations between business object nodes that group semantically related attributes. Additionally, each attribute may be structurally defined by an underlying global data type—so-called element data type or global data type (centrally defined data type). Finally, the instances of business objects provide business-related terminology, e.g. a material business object provides the definition of material and the material names used and defined in a particular company.

DETAILED DESCRIPTION

Figure 1:
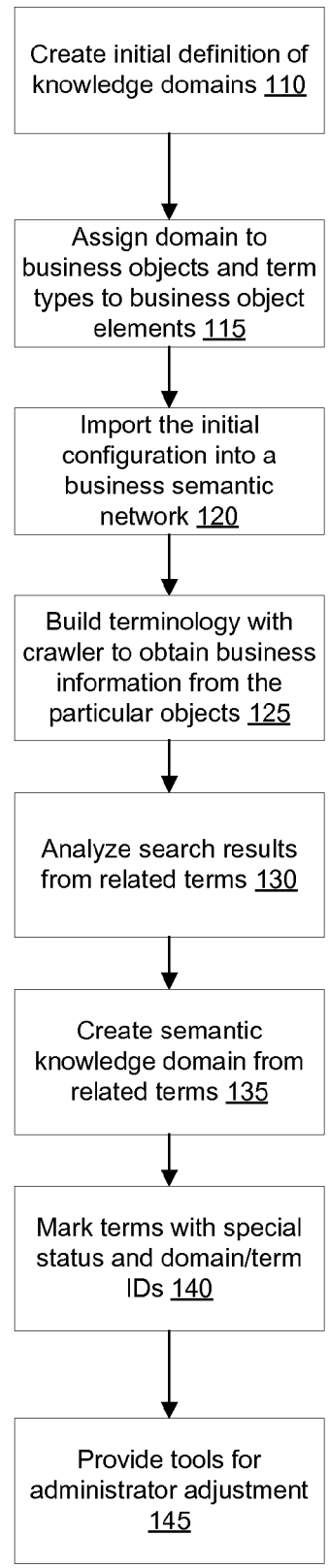
FIG. 1 illustrates an example method of creating a knowledge domain, according to an example EHP schedule.

Example embodiments of the present invention may use the business object as an ideal source of terminology, since it provides the definition of terms and also relevant metadata. The business objects, combined with a search engine that allows for the extraction of business data (e.g., in a business object-oriented way) provide a foundation for building indexes and the knowledge domains. Search engines such as SAP Enterprise Search, TREX, and/or column oriented DB may be used in this role. The search engine may allow for defining of searchable objects which encapsulate particular business objects and can be called by an end-user, using search object requests. A search object may define many requests, and requests may consist of elements inherited from business objects (e.g., the same data type definition). The search engine may obtain business data from business applications and build search structures.

Example embodiments of the present invention may leverage existing term structures in business objects to create a semantic network for a business. Example embodiments may use the already provided business objects as a source of terminology. The objects may provide the definition of business terminology and provide the required metadata. The business object developer (e.g., SAP AG) may deliver the business object definition and each client company may specify terms defined in knowledge domains, and use them for searching of business information, documents, etc. The knowledge domains which are assigned to business objects may be used for building semantic knowledge.

The business object definition may act as a source of metadata. For example, the business object elements and the assigned global data types (GDTs), may form a source of terminology types (so-called term types). The term types may then be used to define the meaning of the assigned terms, e.g., with some form of classification. Since business object definitions (e.g., business object elements and GDTs) may be provided by the developer, the initial configuration (e.g., structure/hierarchy) of domains and term types may also be provided by the developer, and may be used as a basis of information to build a customer-specific semantic network.

Example embodiments may include a terminology extractor that provides a number of functions. The terminology extractor may import the initial configuration provided by the business application/object provider. This function may be implemented in a knowledge importer module. A business application may include one or more business objects that define elements, which are described by GDTs. These business objects may define the initial knowledge definition, which contains the initial knowledge domains (e.g., for each business object), the initial term types (e.g., the data types and GDTs), and an initial set of common terms delivered for all customers. This definition is imported into the business semantic network via the knowledge importer module. The terminology extractor may create content for a business semantic network, using the business search engine (e.g., SAP Enterprise Search or TREX (Text Retrieval and information EXtraction)). This function may be implemented in or supported by a terminology crawler and related term analyzer. The search engine may provide, for each business object, at least one search request that allows obtaining business object related information. The request may provide values for each element—e.g., in a value list along with the search results. In a first step, an example embodiment may take the values for the business object elements (provided by the respective request) and then make subsequent search requests with the value list to determine related terms. The terminology crawler may use this initial definition provided by search engine business object requests to obtain business data (e.g., term definitions) for the objects.

The search engine may have already created indexes for each business object (e.g., a search object) and may provide access using the search object requests (requests are built using business object element definitions). Using the indexes, the search engine may provide the best hits (e.g., results containing business information) for particular requests. Each result may contain the search term and the related terms that are used by the related-term analyzer to enrich existing terminology. The search engine may be configured as to how many related terms are provided in each result. The related term analyzer checks if the related term exists already in a particular knowledge domain and if not, the analyzer may create a new one. This process guarantees that the most used terms in result objects are automatically detected and stored as business terminology in a semantic network.

The terminology crawler may then use the current terminology to create the next search request. This mean the first search requests are created using the imported terms, and the next requests are built using newly imported and/or created terminology. Therefore the terminology crawler may use currently existing terms to obtain new terms, which allows for the constant updating of terminology in the semantic network. The terminology crawler may also allow for the defining of "stopping" conditions (e.g., when the crawling process should stop). This may mean the administrator defines how many calls should be done without a new term being created, or how many calls are created for each business object (e.g., an absolute number of calls for each business object).

The content creation process of the business semantic network may include several steps. First, the business application provider/developer may create the initial definition of domains assigned to business objects and term types assigned to business object elements. Next, the terminology extractor, using a knowledge importer, imports the initial configuration into the business semantic network. The terminology extractor may start building terminology by using the terminology crawler to obtain business information from particular business objects. Next, the related term analyzer may take the search responses and extract the related terms. The terminology crawler may then use those terms (e.g., terms and related terms) to create a semantic knowledge domain. The business semantic network then marks the newly created and/or imported terms with a special status. The knowledge administrator (whether a person or group of persons responsible for business knowledge in one or many domains) confirms the terms, modifies, and if required, reassign them. The administrator may configure which data, e.g., which business object domain should be crawled and which elements are relevant (e.g., specifying that elements containing numbers, etc. should be extracted from the process). Additionally, the business object and respective search object request may define element groups and therefore the element configuration may be respectively reflected with relations in the business semantic network.

These created terms in the knowledge domain may be linked with already existing terms in other knowledge domains. This may mean the terms are linked with other terms defined in other business objects. The terminology extractor may then use the business object definition to build the term links. Terms may be identified by domain ID and term ID, which describes a unique meaning of the term in a particular knowledge domain. Additionally, the terminology administrator may verify the terminology definition and modify the term definition (e.g., add related terms). The terminology extractor can be used as a convenience tool to build links, e.g., by using external terminology definitions (e.g., third-party definitions—lexicons) to propose related terms.

Example embodiments of this proposed solution use the business terminology stored in business applications and expressed via business objects to automatically build the business-oriented semantic network. This may be uniquely important for customer-specific knowledge domains and terminology. In this context, a mere import of predefined semantic terminology would not provide a customer-specific solution. The building of semantic knowledge domains in each company is time consuming with a high cost of implementation, e.g., the structuring and entering of the terminology and its organization (e.g., assignment to domains and term types). Further, the process may very often be error prone. Therefore, the process simplification via example embodiments of the present invention includes defining of automatic process that supports the terminology creation. Example embodiments may bring savings in the implementation phase of semantic-based knowledge domain solutions. The solution supports automatic creation for each business object, which means business application providers (e.g. SAP) provide an initial configuration. This initial configuration includes domains mapped to business object definitions, term types defined from business object element definitions, and other object content. The term used by customers have definitions automatically created from content stored in business applications, business objects, and available via search results.

FIG. 1 illustrates an example method, according to one example embodiment of the present invention. First, at 110, the example method may create an initial definition of the knowledge domain. This may also include importing, loading, or otherwise receiving an initial definition. Next, at 115, the domain may be assigned to business objects within that domain, and term types may be assigned to business object elements. This initial domain may then be imported into a business semantic network, e.g., at 120. The initial semantic network may be based on the knowledge domain, mapped objects, and term-types of object elements within those mapped objects. A crawler may then be used (e.g., at 125) to build terminology from customer definitions within the business objects. At 130, search results may be analyzed to identify related terms. The semantic knowledge domain may then be based on these related terms, e.g., at 135. Terms may be marked with a special status at 140, which may include a domain ID and/or term ID. Finally, at 145, tools may be provided to one or more administrators to modify, confirm, delete, or otherwise revise the knowledge domain and related terms.

Figure 2:
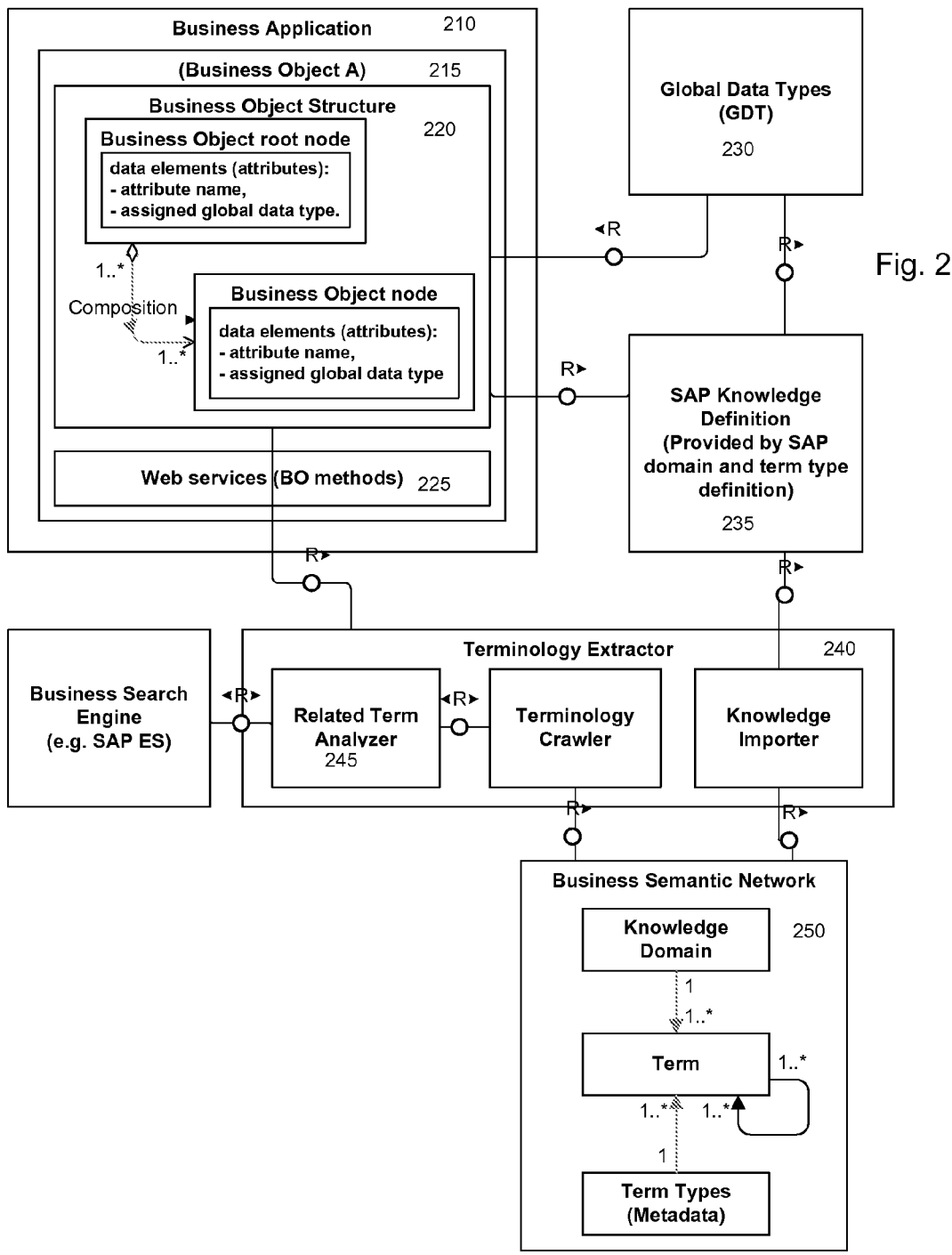
FIG. 2 illustrates one example system, according to one example embodiment of the present invention.

FIG. 2 illustrates an example system component set, according to one example embodiment of the present invention. There may be a business application 210, that may include one or more business objects (e.g., business object A 215). Each business object may have a structure 220, that includes a hierarchy of business object nodes, each with defined attributes/data elements. Each business object may also have defined methods (e.g., 225). Additionally, there may be a global data type module 230, where initial data type definitions are stored. There may be a knowledge definition module 235, that includes an initial knowledge domain for an initial object structure. There may also be a terminology extractor 240 that includes a terminology crawler, a knowledge importer, and a related term analyzer. The terminology crawler may then make calls via the related term analyzer while building a business semantic network 250. Results of a search engine 260 may be based on certain knowledge domains defined in business semantic network 250, as determined by related term analyzer 245.

Figure 3:
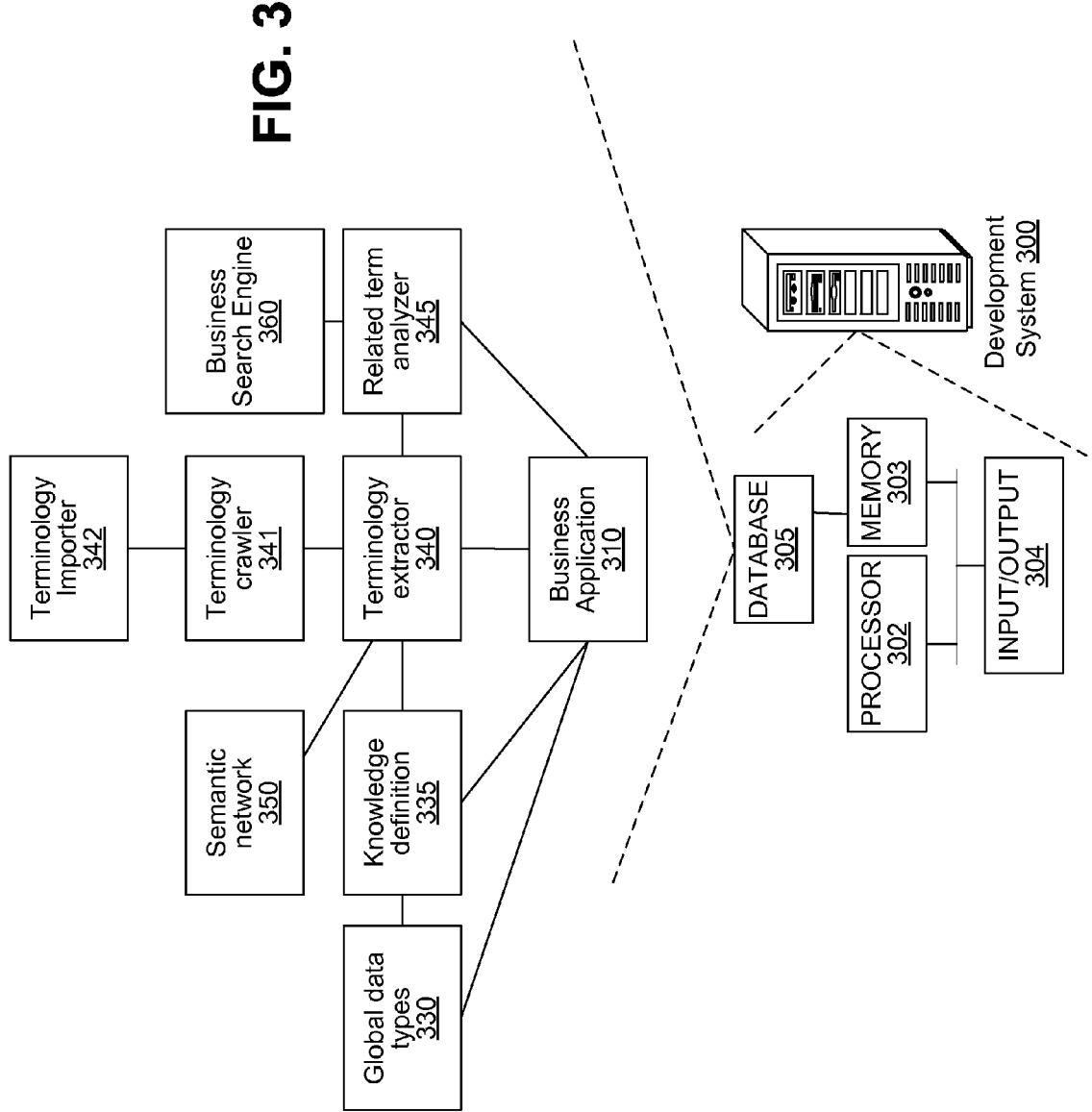
FIG. 3 illustrates another example system, according to one example embodiment of the present invention.

FIG. 3 illustrates another example system, according to an embodiment of the present invention. The example may include one or more server computer systems, e.g., development system 300. This may be one server, a set of local servers, or a set of geographically diverse servers. Each server may include an electronic computer processor 302, one or more sets of memory 303, including database repositories 305, and various input and output devices 304. These too may be local or distributed to several computers and/or locations. Database 305 may include data comprising the various software components of the other example embodiments of the present invention.

For example, the database may include the business application 310. The database may include the global data types module 330, and a knowledge definition module 335. The database 305 may include a related term analyzer 245 and a terminology extractor 240. The system may also include a business semantic network module 350, including knowledge domains, terms, and term type metadata. These entities may be stored in database 305, or may be distributed across other systems, independently or connected via a communication network.

Any suitable technology may be used to implement embodiments of the present invention, such as general purpose computers. One or more system servers may operate hardware and/or software modules to facilitate the inventive processes and procedures of the present application, and constitute one or more example embodiments of the present invention. Further, one or more servers may include a computer readable storage medium, e.g., memory 303, with instructions to cause a processor, e.g., processor 302, to execute a set of steps according to one or more example embodiments of the present invention.

Further, example embodiments of the present invention are directed to one or more processors, which may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors may be embodied in a server or user terminal or combination thereof. The user terminal may be embodied, for example, a desktop, laptop, hand-held device, Personal Digital Assistant (PDA), television set-top Internet appliance, mobile telephone, smart phone, etc., or as a combination of one or more thereof. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods and procedures.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

The invention claimed is:

1. A method for building a semantic network of knowledge domains, comprising:
for each of a plurality of pre-existing business objects:
building a knowledge domain, including:
importing, with an electronic processor, an initial configuration based on structured terms pre-defined in the respective pre-existing business object;
executing, with the electronic processor, a search for each term of the initial configuration using a search tool that provides search results that include the respective term and related terms;
creating a new term for the knowledge domain for each of the related terms not currently in the knowledge domain; and
connecting the respective term to the new term within the knowledge domain.

2. The method of claim 1, wherein the importing includes converting a pre-existing business object index created by a search engine into an initial knowledge domain hierarchy.

3. The method of claim 1, further comprising:
each time the search tool executes: modifying the knowledge domain with any new terms not currently in the knowledge domain.

4. The method of claim 1, further comprising:
marking each new term of the knowledge domain for follow-up; and
presenting the marked terms to an administrator for at least one of: approval, modification, reassignment.

5. The method of claim 1, further comprising:
for each new term created in the knowledge domain, repeating the executing, creating, and connecting for any terms returned as related to the respective new term.

6. A non-transitory computer-readable storage medium encoded with instructions configured to be executed by a processor, the instructions which, when executed by the processor, cause the performance of a method, comprising:
for each of a plurality of pre-existing business objects:
building a knowledge domain, including:
importing, with an electronic processor, an initial configuration based on structured terms pre-defined in the respective pre-existing business object;
executing, with the electronic processor, a search for each term of the initial configuration using a search tool that provides search results that include the respective term and related terms;
creating a new term for the knowledge domain for each of the related terms not currently in the knowledge domain; and
connecting the respective term to the new term within the knowledge domain.

7. The method of claim 6, wherein the importing includes converting a pre-existing business object index created by a search engine into an initial knowledge domain hierarchy.

8. The method of claim 6, further comprising:
each time the search tool executes: modifying the knowledge domain with any new terms not currently in the knowledge domain.

9. The method of claim 6, further comprising:
marking each new term of the knowledge domain for follow-up; and
presenting the marked terms to an administrator for at least one of: approval, modification, reassignment.

10. The method of claim 6, further comprising:
for each new term created in the knowledge domain, repeating the executing, creating, and connecting for any terms returned as related to the respective new term.

11. A system for building a semantic network of knowledge domains, comprising:
an electronic processor configured to:
build, for each of a plurality of pre-existing business objects, a knowledge domain, including:
importing an initial configuration based on structured terms pre-defined in the respective pre-existing business object;
executing a search for each term of the initial configuration using a search tool that provides search results that include the respective term and related terms;
creating a new term for the knowledge domain for each of the related terms not currently in the knowledge domain; and
connecting the respective term to the new term within the knowledge domain.

12. The system of claim 11, wherein the importing includes converting a pre-existing business object index created by a search engine into an initial knowledge domain hierarchy.

13. The system of claim 11, wherein the processor is further configured to:
each time the search tool executes: modify the knowledge domain with any new terms not currently in the knowledge domain.

14. The system of claim 11, wherein the processor is further configured to:
mark each new term of the knowledge domain for follow-up; and
present the marked terms to an administrator for at least one of: approval, modification, reassignment.

15. The system of claim 11, wherein the processor is further configured to:
for each new term created in the knowledge domain, repeat the executing, creating, and connecting for any terms returned as related to the respective new term.

* * * * *